United States Patent
Connolly et al.

(10) Patent No.: US 9,199,634 B2
(45) Date of Patent: *Dec. 1, 2015

(54) HYBRID ELECTRIC VEHICLE BATTERY THERMAL MANAGEMENT

(71) Applicant: Eaton Corporation, Cleveland, OH (US)

(72) Inventors: Thomas R. Connolly, Portage, MI (US); Xiaosong Kang, Portage, MI (US); George A. Brunemann, Cincinnati, OH (US)

(73) Assignee: Eaton Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/143,907

(22) Filed: Dec. 30, 2013

(65) Prior Publication Data

US 2014/0114524 A1 Apr. 24, 2014

Related U.S. Application Data

(63) Continuation of application No. 12/549,790, filed on Aug. 28, 2009, now Pat. No. 8,616,312.

(51) Int. Cl.
| | |
|---|---|
| *B60W 10/24* | (2006.01) |
| *B60W 20/00* | (2006.01) |
| *B60K 6/48* | (2007.10) |
| *B60W 10/06* | (2006.01) |
| *B60W 10/08* | (2006.01) |
| *B60W 10/26* | (2006.01) |

(52) U.S. Cl.
CPC ............ *B60W 20/106* (2013.01); *B60K 6/48* (2013.01); *B60W 10/06* (2013.01); *B60W 10/08* (2013.01); *B60W 10/26* (2013.01); *B60W 20/00* (2013.01); *B60L 2240/486* (2013.01); *B60W 2510/1015* (2013.01); *B60W 2520/10* (2013.01); *Y02T 10/6221* (2013.01); *Y02T 10/6286* (2013.01); *Y10S 903/907* (2013.01)

(58) Field of Classification Search
CPC ..................................................... B60W 10/24
USPC ........ 180/65.2, 65.23, 65.25, 65.235, 65.245, 180/65.28, 65.29, 65.265
See application file for complete search history.

(56) References Cited

U.S. PATENT DOCUMENTS

| | | | | |
|---|---|---|---|---|
| 5,540,202 | A * | 7/1996 | Cullen et al. | 123/406.47 |
| 5,617,836 | A * | 4/1997 | Cullen et al. | 123/674 |
| 6,112,724 | A * | 9/2000 | Kotwicki et al. | 123/494 |
| 6,232,744 | B1 * | 5/2001 | Kawai et al. | 320/132 |
| 6,694,232 | B2 * | 2/2004 | Saito et al. | 701/22 |
| 6,727,670 | B1 * | 4/2004 | Grabowski et al. | 318/432 |
| 6,739,418 | B2 * | 5/2004 | Ogata et al. | 180/65.245 |
| 6,781,251 | B2 * | 8/2004 | Takaoka et al. | 290/40 C |
| 6,870,336 | B2 * | 3/2005 | Murakami et al. | 318/432 |

(Continued)

*Primary Examiner* — Hau Phan
(74) *Attorney, Agent, or Firm* — Fishman Stewart Yamaguchi PLLC

(57) ABSTRACT

A method of operating a vehicle powertrain system where the powertrain system includes a fuel controlled engine, an electric motor, and a battery, the fuel, controlled engine and the electric motor capable of powering the powertrain system. The powertrain system is capable of operating in a plurality of operational modes. The method includes detecting a current value representative of a current flowing through a portion of the battery, calculating a first value representative of the current over a predetermined amount of time, and de-rating at least one of the plurality of operational modes in response to the calculated first value.

22 Claims, 4 Drawing Sheets

(56) References Cited

U.S. PATENT DOCUMENTS

| | | |
|---|---|---|
| 6,898,505 B2 * | 5/2005 | Kadota et al. .................. 701/71 |
| 7,073,615 B2 * | 7/2006 | Mack ....................... 180/65.235 |
| 7,216,729 B2 * | 5/2007 | Syed et al. ................ 180/65.28 |
| 7,267,191 B2 | 9/2007 | Xu et al. |
| 7,368,886 B2 | 5/2008 | Hsieh et al. |
| 7,407,026 B2 * | 8/2008 | Tamor ....................... 180/65.28 |
| 7,639,018 B2 | 12/2009 | Zettel et al. |
| 7,688,074 B2 | 3/2010 | Cox et al. |
| 7,869,911 B2 * | 1/2011 | Yamaguchi .................... 701/22 |
| 8,583,301 B2 * | 11/2013 | Okubo et al. .................. 701/22 |
| 8,616,312 B2 * | 12/2013 | Connolly et al. ......... 180/65.29 |
| 2004/0162683 A1 * | 8/2004 | Verbrugge et al. ............. 702/64 |
| 2006/0021809 A1 * | 2/2006 | Xu et al. ..................... 180/65.2 |
| 2006/0058932 A1 * | 3/2006 | Garg et al. ....................... 701/29 |
| 2006/0241826 A1 * | 10/2006 | Ishishita et al. ................. 701/22 |
| 2007/0112496 A1 * | 5/2007 | Ji .................................... 701/70 |
| 2007/0284162 A1 * | 12/2007 | Zettel et al. ................. 180/65.2 |

* cited by examiner

HYBRID ELECTRIC VEHICLE BATTERY THERMAL MANAGEMENT

CROSS REFERENCE TO RELATED APPLICATIONS

This application is a continuation application of U.S. application Ser. No. 12/549,790, filed on Aug. 28, 2009, the contents which is hereby incorporated by reference in its entirety.

TECHNICAL FIELD

The disclosure generally relates to power usage and temperature control of hybrid electric vehicle batteries.

BACKGROUND

Typical parallel hybrid electric vehicles include an internal combustion engine, an electrical machine, and a battery. Parallel hybrid electric vehicles typically operate using the electric machine and/or the internal combustion engine as prime movers to propel the vehicle. That is, torque may be provided to the vehicle wheels using only the electrical machine, only the engine, or using some combination of torque from both prime movers. Generally, the electrical machine will work as a motor or generator during the period of vehicle acceleration or deceleration, respectively. An inverter may be operably positioned between the electrical machine and the battery to implement the electrical DC or AC power conversion between the electrical machine and the battery.

In a hybrid mode, both the electrical machine and the engine may provide torque to the driven wheels of the vehicle for propulsion. During acceleration or electric only operation, the electrical machine will function as a motor to help propel the vehicle, and the battery will discharge to provide electrical power to drive the motor. During deceleration operation, the electrical machine will function as a generator to charge the battery by absorbing the deceleration mechanical energy.

Because of frequent stop-and-go or acceleration-and-deceleration vehicle operation, the battery will be charged and discharged frequently in a cycling operation. Such cycling operation typically results in heat generation by the battery. The longer the discharging/charging period or the greater the charging/discharging current, the more heat the battery will generate, thus resulting in higher battery temperatures which may impact battery life significantly.

A de-rating of the battery may be used where the battery temperature is monitored and the power supplied by the battery is limited when the battery temperature exceeds a preselected level (or the battery power may be lowered proportionally as the temperature increases). However, this de-rating may not prevent the battery from exceeding an undesirable temperature, and may result in operating the battery unnecessarily at a de-rated capacity. Further, to increase the fuel efficiency of a hybrid vehicle, the battery should operate at the highest capacity possible, and to improve the hybrid battery life, the battery should operate below the desirable temperature.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are exemplary and are not intended to be exhaustive or otherwise limit or restrict the claims to the precise forms and configurations shown in the drawings and disclosed in the following detailed description.

DETAILED DESCRIPTION

Figure 1:
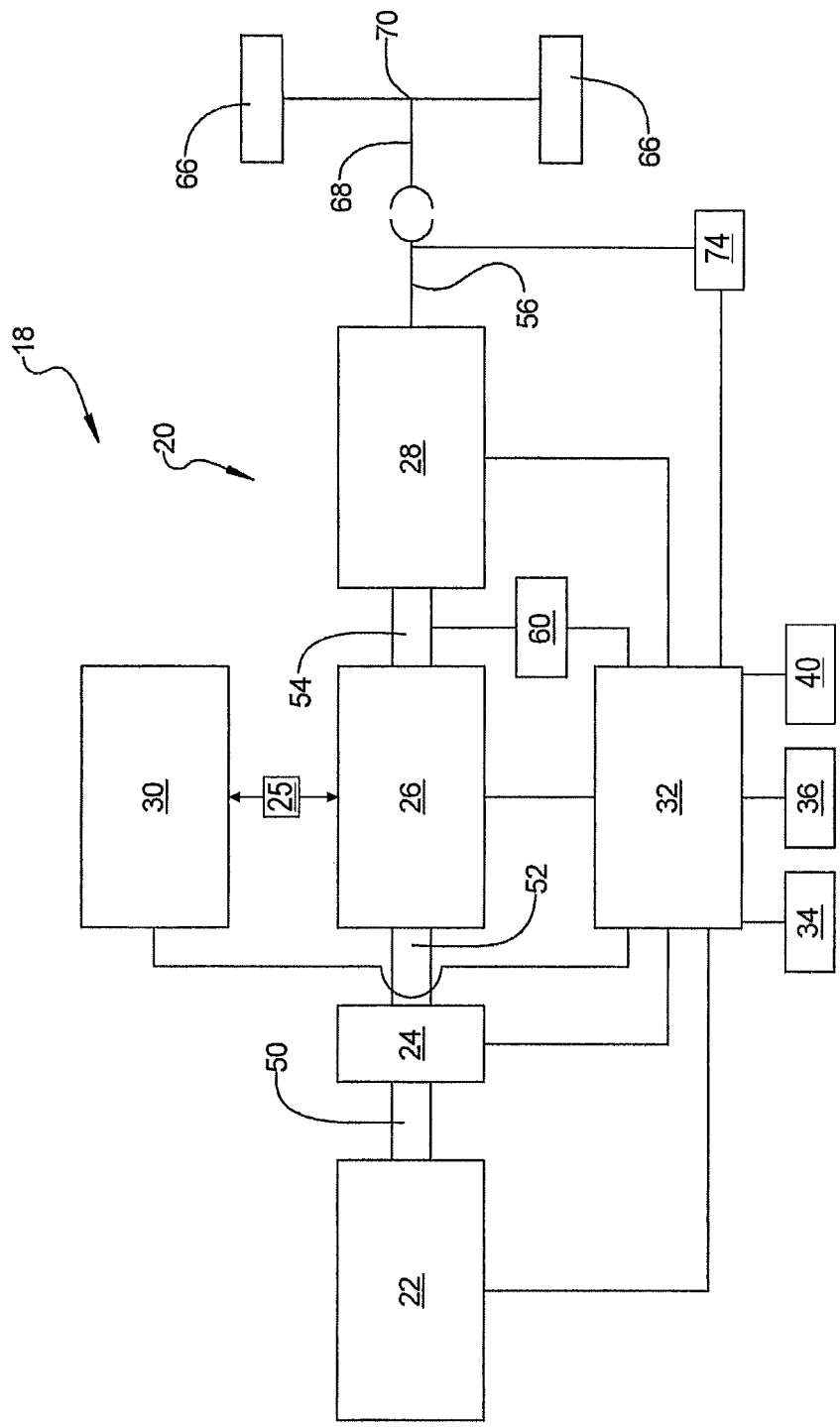
FIG. 1 is a schematic of a hybrid vehicle powertrain system, according to an exemplary embodiment.

FIG. 1 schematically illustrates a vehicle 18 having a hybrid vehicle powertrain system 20. The hybrid vehicle powertrain system 20 includes a fuel controlled engine such as an internal combustion engine 22, a clutch assembly 24, a motor-generator (or motor) 26, a transmission 28, a battery or battery portion 30, a controller 32, and a user interface 34. An inverter 25 or other component may be located between the motor-generator 26 and the battery 30, as desired. Engine 22 and motor-generator 26 are examples of prime movers for vehicle 18. According to one exemplary embodiment, the motor-generator 26 may operate both as an electric motor configured for transforming electrical energy into mechanical energy, and as a generator configured for transforming mechanical energy into electrical energy. Controller 32 may be a processor or microprocessor configured for detecting parameters and providing outputs as discussed in greater detail herein. The system 20 may also include ignition 36 for starting system 20, although the controller 32 may be operational and perform functions even with the ignition 36 in an off configuration.

Controller 32 may be electronically and microprocessor-controlled and may provide output information to an electronic data link DL, preferably conforming to the industry standard SAE J1939 or a comparable protocol. A data link, conforming to the SAE J1939 protocol or a comparable protocol, transmits information by which information associated with the prime mover and related components may be interpreted and acted upon. Controller 32 may be a single controller or one of a series of interconnected controllers. Although not shown, controller 32 may be of general construction having a central processing unit (CPU), various co-processors, a read only memory (ROM), a random access memory (RAM), an input for selectively receiving data via a data link from various vehicle components including the prime movers and related components, an output for selectively transmitting command output signals, and a bi-directional bus interconnecting the components.

The controller 32 detects the current flowing through the battery 30, as described in greater detail below. Specifically, the controller 32 may control a Battery Management System (BMS) 40 that detects battery parameters and controls the usage of components within the system 20. BMS 40 is connected to controller 32 such as by a CAN link. Alternatively, the BMS may include at least a portion of the controller 32. The current may be measured either directly, such as by controller 32, or indirectly. Indirect measurements of the current may be obtained by measuring a voltage drop across a path carrying a current where the resistance is known or measured, by measuring a magnetic field about a current carrying wire, or by other known methodologies.

The engine 22 includes an output engine shaft 50; the motor-generator 26 includes a motor input shaft 52; and the transmission 28 includes a transmission input shaft 54 and at least one transmission output shaft 56. The clutch assembly 24 selectively couples the engine 22 to the motor-generator 26. The system 20 may also include a transmission input shaft speed sensor 60. Generally, the motor input shaft 52 is coupled for rotation with the transmission input shaft 54 such that the transmission input shaft speed sensor 60 will detect movement of the motor input shaft 52.

Also in the illustrative arrangement of FIG. 1, a transmission output rotation from the transmission output shaft 56 is distributed to wheels 66 through a drive shaft 68 and a differential 70. A vehicle speed sensor 74 may be coupled to the transmission output shaft 56 to permit the controller 32 to sense the speed of the vehicle 18. In the illustrative embodiment of FIG. 1, the motor-generator 26 may be used as a regenerative braking system to generate power from the kinetic energy of the vehicle 18.

As used herein, the Root Mean Square (RMS) current flowing through the battery is calculated by the equation:

$$I_{rms} = \sqrt{\frac{1}{T_2 - T_1} \int_{T_1}^{T_2} I(t)^2 * dt} \qquad \text{Equation 1}$$

Where

I(t) represents the time-varying battery current, and $T_1$ and $T_2$ represent the beginning and ending times of a rolling, fixed-duration sampling period. In one example, the sampling period is 180 seconds.

The heat generated by the battery during the charging and discharging operations of the battery can be attributed to the internal impedance of the battery, and the heat dissipation is proportional to the average power of the battery, as shown below:

$$P_{avg} = (I_{RMS})^2 R \qquad \text{Equation 2}$$

Where R represents the internal impedance of the battery.

During the charging and discharging operations of the battery, the increase in the battery temperature is highly related to battery power loss, which may be represented as:

$$\Delta T \propto P_{avg} \qquad \text{Equation 3}$$

Where ΔT represents the increase in the battery temperature. Combining Equations 1-3 results in the following:

$$\Delta T \propto \int I(t)^2 * dt \qquad \text{Equation 4}$$

Where $\int I(t)^2 * dt$ (I2T accumulation) is a measure of the thermal energy associated with the current flow, and can be directly used for battery thermal control.

In one exemplary embodiment of operating the system 20, the BMS 40 detects the current, calculates the I2T accumulation value over a predetermined period of time, and broadcasts the I2T accumulation value. In one example, the period of time is 180 seconds, although the length of the period of time can be varied. The time period is selected under the considerations of thermal limitations of battery cells and cell connection, and through experimentation.

In the example presented, the I2T accumulation value is desired to never exceed 350,000. This I2T accumulation value limit is selected through experimentation, in an effort to balance performance and cycle life of the battery. Therefore, it is desired that the controller 32 will operate the system 20 and manage the battery 30 such that the I2T accumulation value will not exceed 350,000, while still attempting to attain the best performance.

Figure 2:
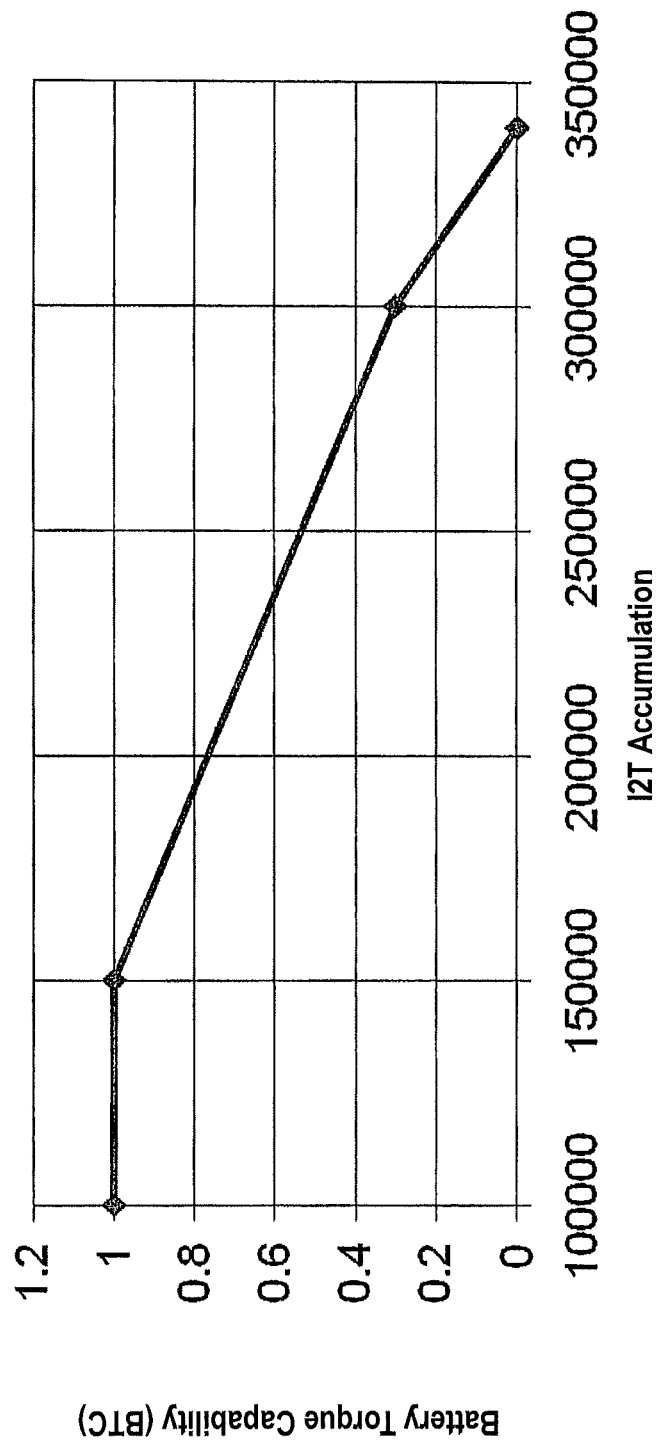
FIG. 2 is a graph illustrating the I2T Accumulation vs. the Battery Torque Capability for a battery according to an exemplary embodiment.

FIG. 2 illustrates an embodiment of a battery management strategy where the controller 32 calculates a normalized Battery Torque Capability (BTC) value based on the I2T accumulation value. When the calculated I2T accumulation value is between about 150,000 and about 350,000, the BTC value decreases from 1.0 to 0.0. Although a generally linear decrease in the BTC is illustrated, the graph of FIG. 2 may include a curve, step transition, or any other decrease from 1.0 to 0.0. In the example of FIG. 2, the BTC value of the battery 30 is assigned a value of 1.0 when the calculated I2T accumulation value is below or equal to 150,000. Further, the BTC value may be assigned a value of 0.0 by the controller 32 when the I2T accumulation value is at a predetermined upper limit, such as, for example, 350,000.

Figure 3:
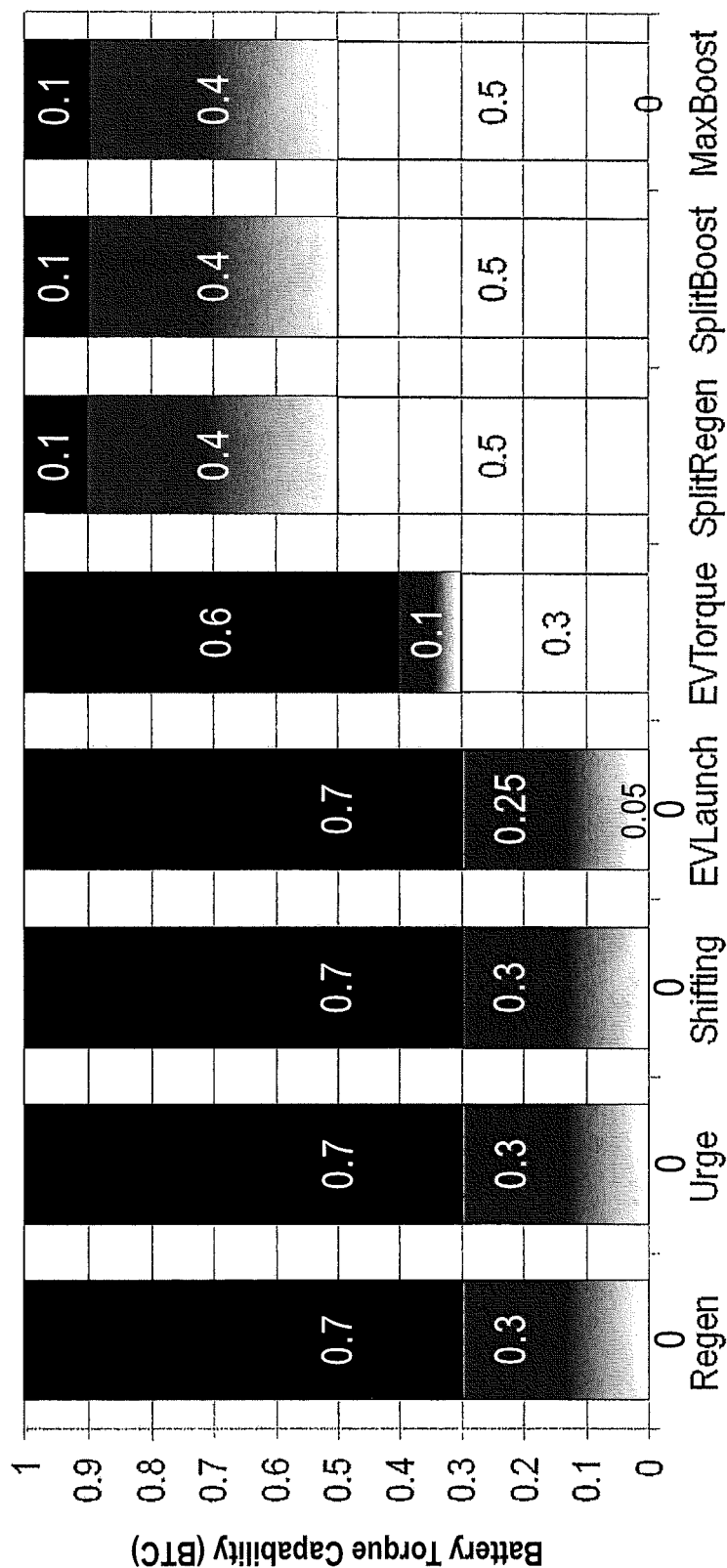
FIG. 3 is a graphical illustration of operational modes of a hybrid vehicle powertrain system vs. the Battery Torque Capability of the battery according to an exemplary embodiment.

FIG. 3 illustrates one implementation of the BTC value (determined in the graph of FIG. 2) used to manage the system. In this exemplary embodiment, the battery management strategy uses the determined BTC value to determine which operational modes may be de-rated (operated at less than peak performance capacity) for operation of the system 20. In this determination, the most 'critical' uses of the system 20 are prioritized. Below is a description of at least some of the operational modes of the system 20 in an exemplary embodiment during normal hybrid driving operation in the order of most to least important or 'critical'. FIG. 3 illustrates one embodiment of how each one of these modes are de-rated depending on the BTC value. Generally, the controller 32 may gradually reduce or eliminate the least important battery uses (to prevent reaching the I2T accumulation limit) so that there is sufficient capacity to perform the 'more important' operational modes. The 'importance' of the operational modes may depend on the BTC value, or other known methodologies including the state of charge of the battery. Accordingly, the ordering of the operational modes shown below is but one example of how the operational modes may be ranked in order of importance.

1. Regen braking—Brake the vehicle 18 to recharge the batteries
2. Urge to Move—Provide drive torque at low speeds when accelerator or brake pedal pressure is not being applied
3. Shifting—Speed synchronization during a shift
4. EV (electric vehicle) Launch—Use motor-generator 26 for launching when input shaft speed is below clutch lockup speed (avoid clutch slipping)
5. EV Torque—Motor-generator 26 only driving when input shaft is above clutch lockup speed (engine continues to idle)
6. SplitRegen—Use engine to regenerate batteries at very low state of charge
7. SplitBoost—Use motor-generator 26 to provide positive driving torque while reducing torque commands from the engine
8. MaxBoost—Add motor-generator 26 torque to engine 22 torque for acceleration In the example of FIG. 3, the Regen braking, Urge to Move, and Shifting operational modes, the most important of the operational modes, are each used until the BTC value reaches 0.0. De-rating of each of these operational modes may begin when the BTC value is less than 0.3, and the de-rating of these operational modes is complete when the BTC value reaches 0.0. That is, the system 20 may permit the operation of some operational modes such as the perceived most important operational modes until the BTC value reaches 0.0. This is equivalent to the I2T accumulation value approaching the exemplary predetermined limit of 350,000. Additionally, the EV Launch operational mode may be utilized when the BTC value is 0.05 to 1.0, and the controller 32 may prevent the system 20 from operating in the EV Launch operational mode when the battery capability value is below 0.05. The EV Launch operational mode may be de-rated by the controller 32 when the BTC value is between 0.3 and 0.05.

Further, in the example presented, the EV Torque operational mode may be utilized when the BTC value is 0.30 to 1.0, and the controller 32 may not permit the system 20 from operating in the EV Torque operational mode when the BTC value is less than 0.30. De-rating of the EV Torque operational mode may occur when the BTC value is between about 0.4 and 0.3. Also, the SplitRegen, SplitBoost, and MaxBoost operational modes, the least important operational modes, may be utilized when the BTC value is 0.50 to 1.0, and the controller 32 may not permit the system 20 from operating in the SplitRegen, SplitBoost, and MaxBoost operational modes when the BTC value is less than 0.50. De-rating of the SplitRegen, SplitBoost and MaxBoost operational modes may occur when the BTC value is between 0.9 and 0.5. Accordingly, the controller 32 may prevent the hybrid powertrain system 20 from operating in at least one of the plurality of operating modes in response to the determined BTC value.

As shown in FIG. 3, when the BTC value is between 1.0 and 0.9, all of the operational modes are operating at peak performance capacity. When the BTC value decreases below 0.9, de-rating of the SplitRegen, SplitBoost and MaxBoost operational modes begins. In the illustrated approach these operational modes are as being the least important operational modes. The remaining operational modes continue to operate at peak performance capacity at the BTC value of 0.9. When the BTC value reaches 0.5, the SplitRegen, SplitBoost and MaxBoost operational modes have been completely de-rated, and are no longer operational. In this manner, the perceived least critical operational modes are the first operational modes to be de-rated, and the first operational modes to be rendered inoperable. At a BTC value of 0.4, de-rating of the EVTorque operational mode begins. When the BTC value reaches 0.3, the EVTorque operational mode has been completely de-rated, and is no longer operational. Further, at a BTC value of 0.3, de-rating of the Regen braking, Urge to Move, Shifting, and EVLaunch operational modes begins. When the BTC value reaches 0.05, the EVLaunch operational mode has been completely de-rated, and is no longer operational. At this point, the only operational modes still operating are Regen braking, Urge to Move and Shifting, illustrated in the example as being the most critical operational modes. When the BTC value reaches 0.0, the remaining operational modes, Regen braking, Urge to Move and Shifting have been completely de-rated, and are no longer operational. In this manner, the most important operational modes are the last operational modes to be de-rated, and the last operational modes to be rendered inoperable.

Figure 4A:
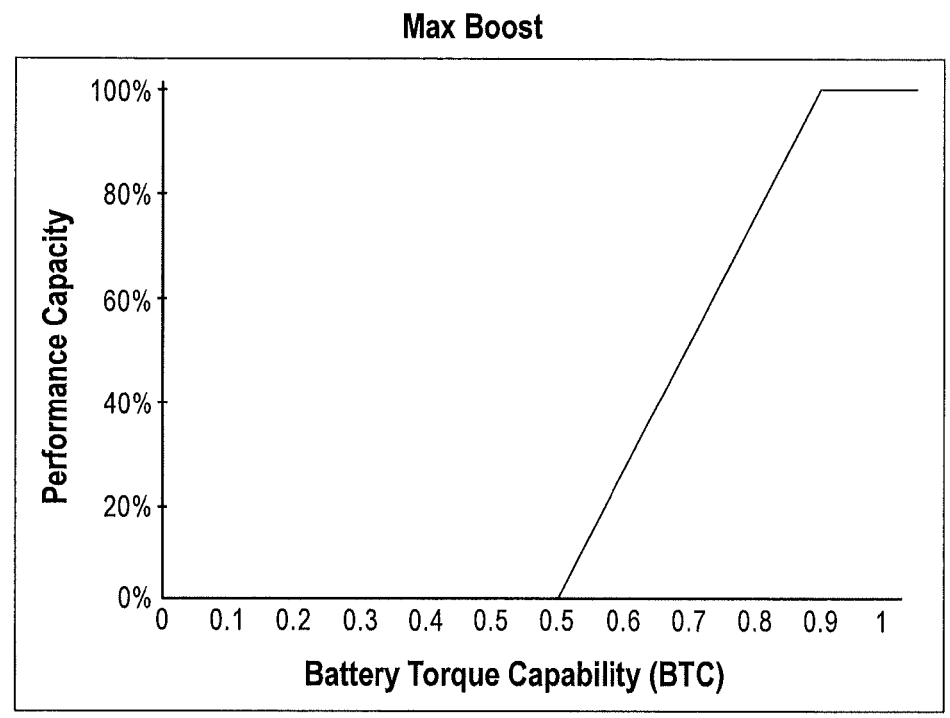
FIGS. 4A and B are graphical illustrations of the Battery Torque Capability vs the performance percentage of some of the operational modes of a hybrid vehicle powertrain system according to the exemplary embodiment of FIG. 3.

FIG. 4A illustrates the performance capacity of one of the operational modes shown in FIG. 3, MaxBoost, against the BTC value. When the BTC value is between 1.0 and 0.9, the MaxBoost operational mode operates at a performance capacity of 100%. When the BTC value is less than 0.9 and greater than or equal to 0.5, the MaxBoost operational mode is de-rated, and operates at a reduced performance capacity. Once the BTC value reaches 0.5, the de-rating of the MaxBoost operational mode is complete, and the MaxBoost operational mode is no longer operational. The SplitRegen and SplitBoost operational modes as shown in FIG. 3 would follow the same pattern as shown for the MaxBoost operational mode in FIG. 4A.

Figure 4B:
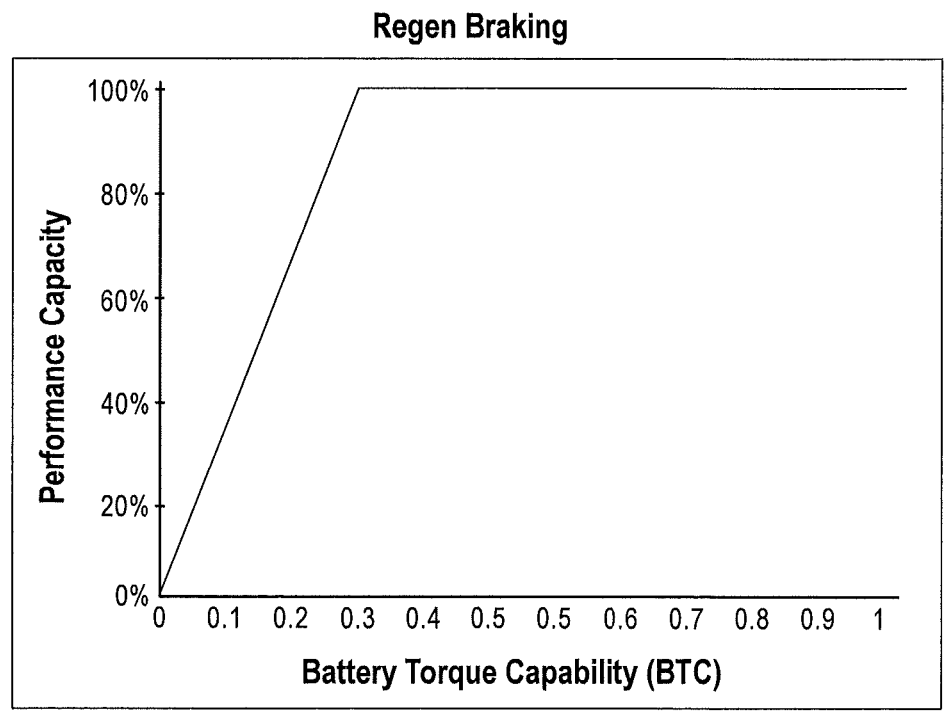

FIG. 4B illustrates the performance capacity of another of the operational modes shown in FIG. 3, Regen braking, against the BTC value. When the BTC value is between 1.0 and 0.3, the Regen braking operational mode operates at a performance capacity of 100%. When the BTC value is less than 0.3 and greater than or equal to 0.0, the Regen braking operational mode is de-rated, and operates at a reduced performance capacity. Once the BTC value reaches 0.0, the de-rating of the Regen braking operational mode is complete, and the Regen braking operational mode is no longer operational. The Urge to Move and Shifting operational modes as shown in FIG. 3 would follow the same pattern as shown for the MaxBoost operational mode in FIG. 4B.

Although a generally linear decrease in the performance capacity of the MaxBoost and the Regen braking operational modes is illustrated, the graphs of FIG. 4A-B may include a curve, step transition, or any other decrease from 100% to 0% performance capacity.

While the powertrain system 20 is illustrated in one exemplary approach, the novel aspects contained herein may be used with any powertrain system, such as parallel hybrid systems, series hybrid systems and combined hybrid systems.

Further the illustration of FIG. 3 may also include the I2T accumulation value on the same scale as the battery capability value with an I2T accumulation value of 150,000 equivalent to the battery capability value of 1.0 and an I2T accumulation value of 350,000 equivalent to the battery capability value of 0.0 to provide a reference between the I2T accumulation value and the magnitude thereof that may result in de-rating or preventing the operation of some of the operational modes of the system 20. For example, the controller 32 may de-rate the SplitRegen, SplitBoost, and MaxBoost operational modes when the I2T accumulation value is 250,000 or more. Accordingly, the battery capability value may be representative of the I2T accumulation value.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A method of operating a vehicle powertrain system, the powertrain system including a fuel controlled engine, an electric motor, and a battery, the fuel controlled engine and the electric motor capable of powering the powertrain system, the powertrain system capable of operating in a plurality of operational modes, the method comprising:

detecting a current value representative of a current flowing through a portion of the battery;

calculating a first value representative of the current over a predetermined amount of time; and de-rating at least one of the plurality of operational modes in response to the calculated first value.

2. The method of claim 1, further comprising determining a battery torque capability value based upon the first value, wherein the de-rating of the at least one of the plurality of operational modes is based upon the battery torque capability value.

3. The method of claim 2, wherein de-rating the at least one of the plurality of operational modes includes comparing the battery torque capability value to a first preselected limit for each operational mode.

4. The method of claim 3, wherein de-rating the at least one of the plurality of operational modes includes comparing the battery torque capability value to a second preselected limit for each operational mode.

5. The method of claim 2, wherein de-rating at least one of the plurality of operational modes includes sequentially de-rating the plurality of operational modes in response to the battery torque capability value.

6. The method of claim 4, wherein sequentially de-rating the plurality of operational modes includes sequentially rendering inoperable the plurality of operational modes in response to the battery torque capability value.

7. The method of claim 1, further comprising prioritizing the plurality of operational modes in an order.

8. The method of claim 7, wherein the plurality of operational modes are de-rated in accordance with the prioritized order of the plurality of operational modes, starting with the least important operational modes.

9. The method of claim 8, wherein the de-rating of the plurality of operational modes includes rendering inoperable the plurality of operational modes in accordance with the prioritized order of the plurality of operational modes.

10. The method of claim 1, wherein de-rating at least one of the plurality of operational modes includes reducing the performance capacity of the operational mode until the operational mode is rendered inoperable.

11. The method of claim 1, further comprising de-rating at least a second of the plurality of operational modes in response to the calculated first value.

12. The method of claim 11, further comprising prioritizing the plurality of operational modes in an order.

13. The method of claim 12, wherein the plurality of operational modes are de-rated in accordance with the prioritized order of the plurality of operational modes, starting with the least important operational modes.

14. The method of claim 13, wherein the de-rating of the plurality of operational modes includes rendering inoperable the plurality of operational modes in accordance with the prioritized order of the plurality of operational modes.

15. The method of claim 1, wherein de-rating at least one of the plurality of operational modes includes reducing the performance capacity of the operational mode until the operational mode is rendered inoperable.

16. The method of claim 1, further comprising de-rating at least a second of the plurality of operational modes in response to the calculated first value.

17. A method of operating a vehicle powertrain system, the powertrain system including a fuel controlled engine, an electric motor and a battery, the fuel controlled engine and the electric motor capable of powering a drive train system, the powertrain system operating in a plurality of operational modes, the method comprising:
supplying torque from the motor to the powertrain system;
determining a first value representative of thermal energy associated with a current flow through a portion of the battery over a predetermined amount of time; and
de-rating at least one of the plurality of operational modes in response to the determined first value.

18. The method of claim 17, further comprising determining a battery torque capability value based upon the determined first value, wherein the de-rating of the at least one of the plurality of operational modes is based upon the battery torque capability value.

19. The method of claim 18, wherein de-rating the at least one of the plurality of operational modes includes comparing the battery torque capability value to a first preselected limit for each operational mode.

20. The method of claim 19, wherein de-rating the at least one of the plurality of operational modes includes comparing the battery torque capability value to a second preselected limit for each operational mode.

21. The method of claim 18, wherein de-rating at least one of the plurality of operational modes includes sequentially de-rating the plurality of operational modes in response to the battery torque capability value.

22. The method of claim 12, wherein sequentially de-rating the plurality of operational modes includes sequentially rendering inoperable the plurality of operational modes in response to the battery torque capability value.

* * * * *